United States Patent [19]

Tanoi

[11] Patent Number: 5,136,615
[45] Date of Patent: Aug. 4, 1992

[54] PREDICTIVE DECODER

[75] Inventor: Toshiyuki Tanoi, Tokyo, Japan

[73] Assignee: NEC Corporation, Japan

[21] Appl. No.: 640,978

[22] Filed: Jan. 14, 1991

[30] Foreign Application Priority Data

Jan. 16, 1990 [JP] Japan .................................... 2-4448

[51] Int. Cl.$^5$ ........................................... H04B 14/06
[52] U.S. Cl. ....................................... 375/27; 358/136
[58] Field of Search ...................... 375/26, 27, 28, 34; 358/136; 341/143

[56] References Cited

U.S. PATENT DOCUMENTS

| 4,430,670 | 2/1984 | Netravali | 375/26 |
| 4,562,468 | 12/1985 | Koga | 375/27 |
| 4,706,260 | 11/1987 | Fedele et al. | 375/27 |
| 4,774,496 | 9/1988 | Tomasevich | 375/27 |
| 4,843,465 | 1/1989 | Yuasa et al. | 375/27 |
| 4,888,640 | 12/1989 | Acampora et al. | 375/27 |

FOREIGN PATENT DOCUMENTS 2144299 2/1985 United Kingdom .

OTHER PUBLICATIONS

Bernard Lippel, Marvin Kurland, "The Effect of Dither on Luminance Quantization of Pictures", IEEE Transactions on Communication Technology, vol. COM-19, No. 6, Dec. 1971, pp. 879–888.

Primary Examiner—Benedict V. Safourek
Assistant Examiner—Young Tse
Attorney, Agent, or Firm—Ostrolenk, Faber, Gerb & Soffen

[57] ABSTRACT

A predictive decoder includes a decoding section, an adder, an inverse quantizer, a processor, and a superposing section. The decoding section decodes a coded signal to obtain a predictive error signal. The adder adds the predictive error signal to a local decoded signal and outputs a sum signal. The inverse quantizer has a plurality of quantization characteristics. The inverse quantizer receives a control signal for designating one of the plurality of quantization characteristics and the sum signal, selects one of the plurality of quantization characteristics in accordance with the control signal, and performs inverse quantization of the sum signal by using the selected characteristic to obtain an inversely quantized signal. The processor converts the inversely quantized signal into the local decoded signal. The noise superposing section receives the control signal and superposes a noise signal on the inversely quantized signal only when the control signal designates a quantization characteristic having a coarse level higher than a predetermined coarse level. An output signal from the noise superposing means is used as an output signal from the decoder.

4 Claims, 2 Drawing Sheets

PREDICTIVE DECODER

BACKGROUND OF THE INVENTION

The present invention relates to a predictive decoder arranged on a side opposite to a predictive coder for performing predictive coding of a motion image signal and, more particularly, to a predictive decoder used for a predictive coder for changing a quantization characteristic in accordance with the data amount of a coded signal.

In a conventional predictive coder of this type, control is performed to change a quantization characteristic in accordance with the data amount of a coded signal as an output.

In this conventional predictive coder, with an increase in data amount of a coded signal, a coarser quantization characteristic is selected. As a result, when a coded signal is decoded by a predictive decoder, a deterioration in image quality, e.g., false contouring (outlines, like contours of a map, appearing at a portion, on a screen, where luminance is gradually changed when the quantum step size is large) occur.

SUMMARY OF THE INVENTION

It is an object of the present invention to provide a predictive decoder which can reduce a deterioration in image quality such as false contouring.

In order to achieve the above object, according to the present invention, there is provided a predictive decoder comprising decoding means for decoding a coded signal to obtain a predictive error signal, an adder for adding the predictive error signal to a local decoded signal and outputting a sum signal, inverse quantization means, having a plurality of quantization characteristics, for receiving a control signal for designating one of the plurality of quantization characteristics and the sum signal, selecting one of the plurality of quantization characteristics in accordance with the control signal, and performing inverse quantization of the sum signal by using the selected characteristic to obtain an inversely quantized signal, processing means for converting the inversely quantized signal into the local decoded signal, and noise superposing means for receiving the control signal and superposing a noise signal on the inversely quantized signal only when the control signal designates a quantization characteristic having a coarse level higher than a predetermined coarse level, wherein an output signal from the noise superposing means is used as a decoder output signal.

DESCRIPTION OF THE PREFERRED EMBODIMENT

An embodiment of the present invention will be described below with reference to the accompanying drawings.

Figure 1:
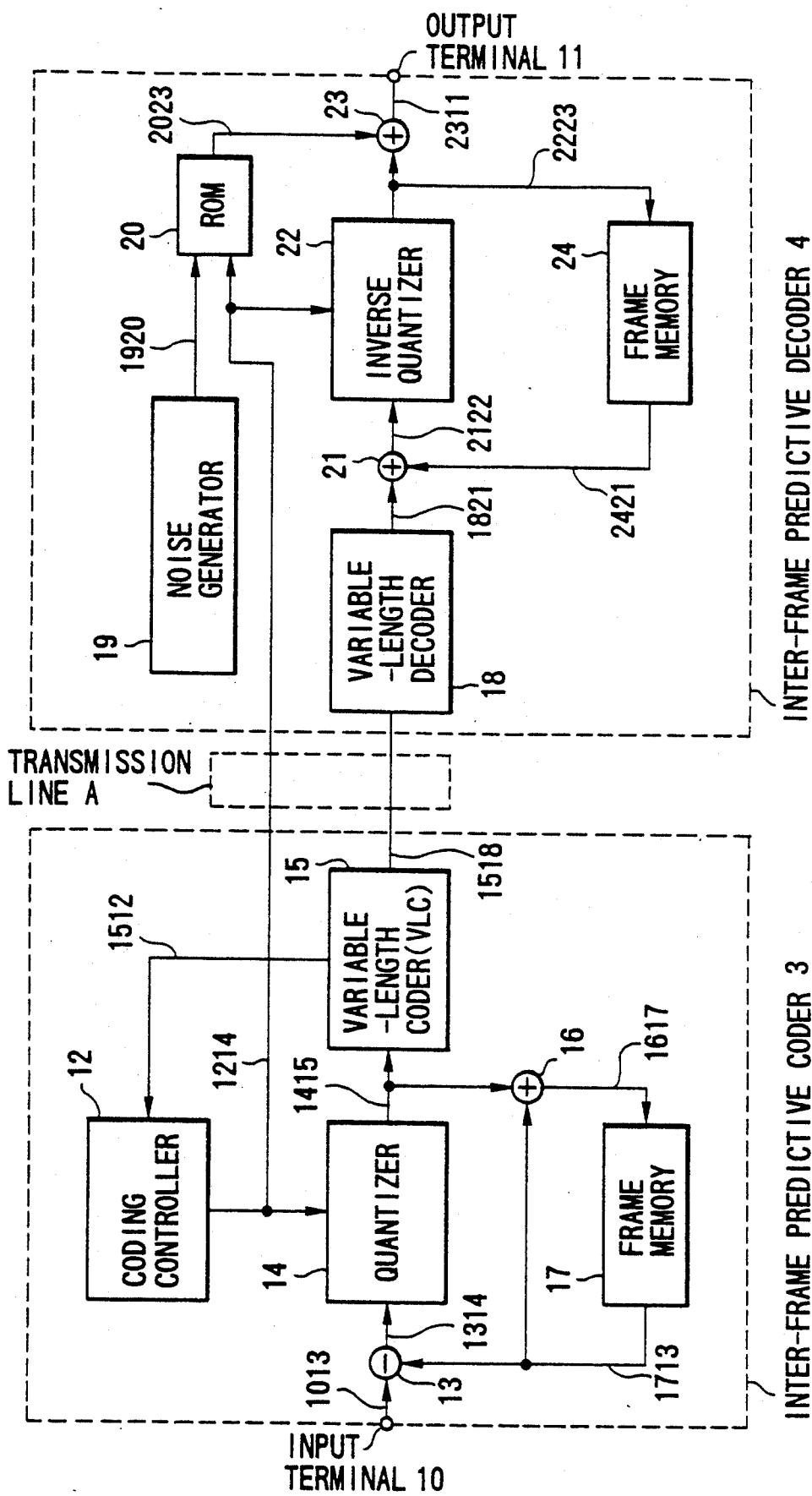
FIG. 1 is a block diagram showing an embodiment of the present invention.

FIG. 1 shows an embodiment of the present invention. In this embodiment, an inter-frame prediction is used as a predictive scheme, and an inter-frame predictive coder 3 and an inter-frame predictive decoder 4 are connected to each other through a transmission line A. Although a control signal 1214 and a coded signal 1518 are illustrated in FIG. 1 as if they are separately transmitted through the transmission line A, they are multiplexed and transmitted through one transmission line in practice.

Referring to FIG. 1, a digital image signal 1013 is input to an input terminal 10. A subtracter 13 subtracts a predictive signal 1713 from a frame memory 17, from the digital image signal 1013, and outputs a predictive error signal 1314. A quantizer 14 selects a specific characteristic from a plurality of types of quantization characteristics in accordance with the control signal 1214, and quantizes the predictive error signal 1314. An adder 16 adds a quantized signal 1415 output from the quantizer 14 to the predictive signal 1713, and outputs a local decoded signal 1617. A variable-length coder (VLC) 15 performs variable-length coding of the quantized signal 1415 to output a coded signal 1518. The VLC 15 has a transmission buffer (not shown) for temporarily storing the coded signal. The VLC 15 calculates the amount of the data stored in the transmission buffer, and outputs a data amount signal 1512 representing the data amount. A coding controller 12 receives the data amount signal 1512 and outputs the control signal 1214 for selecting a quantization characteristic corresponding to the signal 1512 to avoid an overflow and an underflow of the buffer. For example, the coding controller 12 outputs the control signal 1214 for designating a coarser quantization characteristic with an increase in data amount.

In an inter-frame predictive decoder 4, a variable-length decoder 18 receives the coded signal through a transmission line A and decodes the coded signal 1518 into a decoded predictive error signal 1821. An adder 21 adds the decoded predictive error signal 1821 to a prediction signal 2421 which is an output of a frame memory 24 and produces a locally decoded signal 2122. In response to the control signal 1214, an inverse quantizer 22 performs inverse quantization of the locally decoded signal 2122 with the same quantization characteristic as that used by the quantizer 14 so as to obtain a decoded signal 2223. A noise generator or a random number generator 19 generates a random noise signal 1920 having a predetermined average level. A read-only memory (to be referred to as a ROM hereinafter) 20 receives the random noise signal 1920 and the control signal 1214 and produces a converted noise signal 2023 having an average level corresponding to a currently selected quantization characteristic. An adder 23 adds the decoded signal 2223, obtained upon inverse quantization, and the converted noise signal 2023 and produces an output image signal 2311 to an output terminal 11.

Figure 2:
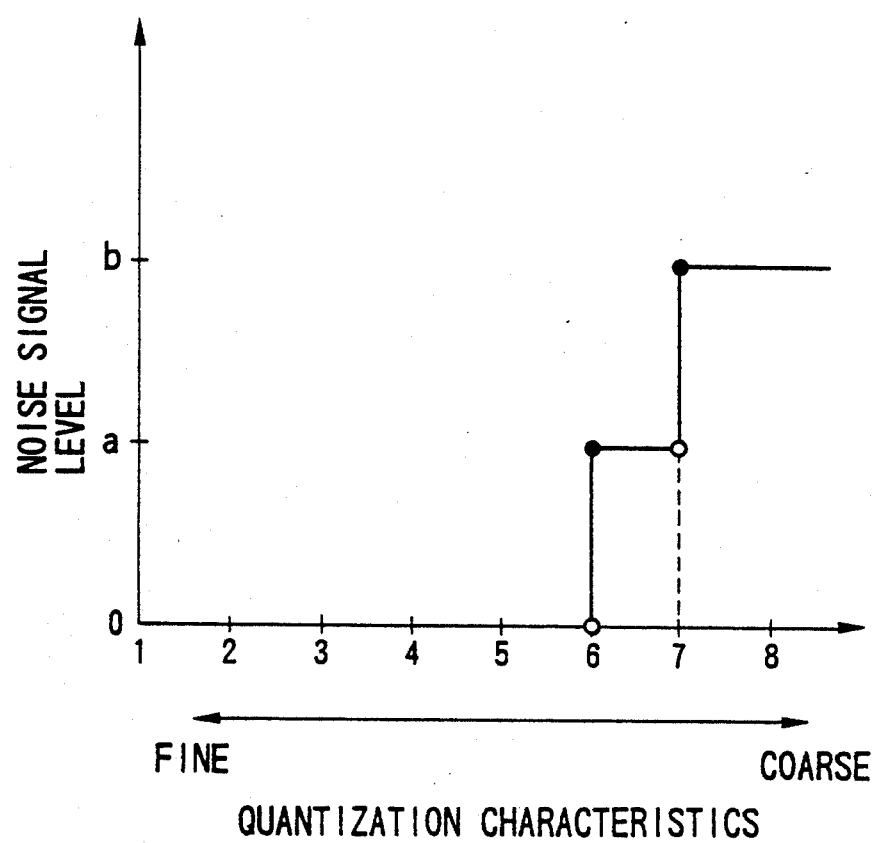
FIG. 2 is a graph showing characteristics of a ROM 20 in FIG. 1.

The ROM 20 will be further described below. FIG. 2 shows characteristics of the ROM 20. Referring to FIG. 2, one of eight types of quantization characteristics (represented by numbers 1 to 8, a larger number indicating a coarser quantization characteristic) is selected by the control signal 1214, and three types of noise signal levels (represented by effective values, provided that $0 < a < b$) are assigned to these quantization characteristics. In practice, an optimal noise signal level is manually determined so as to obtain the best image quality. It is assumed that the ROM 20 has a 11-bit address input, the control signal 1214 is a 3-bit data which represents one of eight quantization characteristics, and the noise generator 19 generates 8-bit random numbers between 0 to 255. In this case, the eleventh (MSB) through the eighth bits of the address inputs are assigned to the control signal 1214 and remaining 8 bits of the address inputs are assigned to represent the random number. Numeral data which comprise the gained noise signals corresponding to the quantization characteristics are stored in the ROM 20 so as to start from the addresses multiple of $2^8$. Therefore, in response to the random numbers, the numeral data are randomly read out and the readout data are supplied to the adder 23 as the gained noise signal which corresponds to the quantization characteristic selected by the control signal 1214.

In the above-described arrangement, if a quantization characteristic is one of quantization characteristics 1st to 5th in FIG. 2, the level of the converted noise signal 2023 is set to be 0, and hence no noise signal is superposed on the decoded signal 2223. On the other hand, if a sixth or one of a seventh and eighth quantization characteristic is selected, a noise signal 2223, respectively, as shown in FIG. 2. As a result, a deterioration in image quality, caused by false contouring which occurs when coarse quantization is performed, can be less conspicuous by a random distribution of noise. In this case, although the S/N ratio is decreased throughout the screen, the image quality can be visually improved.

As has been described above, according to the present invention, a noise signal is superposed on an output image signal only when a control signal designates a quantization characteristic having a coarse level larger than a predetermined level. With this operation, a deterioration in image quality, caused by false contouring which occurs when coarse quantization is performed, can be visually suppressed.

In the above-described embodiment, the noise generator is used to generate 8-bit random numbers corresponding to the quantization characteristics, and one of them is selected by the control signal 1214. It is, however, apparent that random number data corresponding to the quantization characteristics can be stored in a ROM in advance, and the contents of the ROM can be read out by using an address generator, including a counter for counting periodic pulses such as clocks, instead of using the noise generator.

What is claimed is:

1. A predictive decoder comprising:
    decoding means for decoding a coded signal to obtain a predictive error signal;
    an adder for adding the predictive error signal to a local decoded signal and outputting a sum signal;
    inverse quantization means, having a plurality of quantization characteristics, for receiving a control signal for designating one of the plurality of quantization characteristics and the sum signal, selecting one of the plurality of quantization characteristics in accordance with the control signal, and performing inverse quantization of the sum signal by using the selected characteristic to obtain an inversely quantized signal;
    processing means for converting the inversely quantized signal into the local decoded signal; and
    noise superposing means for receiving the control signal and superposing a noise signal on the inversely quantized signal only when the control signal designates a quantization characteristic having a coarse level higher than a predetermined coarse level,
    wherein an output signal from said noise superposing means is used as a decoder output signal.

2. A decoder according to claim 1, wherein said noise superposing means superposes a noise signal having a larger level on the inversely quantized signal with an increase in coarse level when the control signal designates a quantization characteristic having a coarse level higher than the predetermined coarse level.

3. A predictive decoder for communicating with a predictive coder, wherein said predictive coder includes: a subtracter for outputting a difference between a digital image signal and a predictive signal as a predictive error signal; quantization means, having a plurality of quantization characteristics, for receiving a control signal for designating one of the plurality of quantization characteristics and the predictive error signal, for selecting one of the plurality of quantization characteristics in accordance with the control signal, for quantizing the predictive error signal by using the selected characteristic, and for outputting a quantized signal; coding means for coding the quantized signal to obtain a coded signal and outputting a data amount signal representing a data amount of the quantized signal; first processing means for converting the coded signal into the predictive signal; and control means for receiving the data amount signal and outputting the control signal for designating a coarser quantization characteristic with an increase in data amount; said predictive coder being adapted to transmit the coded signal and the control signal, said predictive decoder comprising:
    decoding means for decoding the coded signal to obtain a predictive error signal;
    an adder for adding the predictive error signal to a local decoded signal and outputting a sum signal;
    inverse quantization means, having the plurality of quantization characteristics, for receiving the control signal and the sum signal, selecting one of the plurality of quantization characteristics in accordance with the control signal, and performing inverse quantization of the sum signal by using the selected characteristic to obtain an inversely quantized signal;
    second processing means for converting the inversely quantized signal into the local decoded signal; and
    noise superposing means for receiving the control signal and superposing a noise signal on the inversely quantized signal only when the control signal designates a quantization characteristic having a coarse level higher than a predetermined coarse level,
    wherein an output signal from said noise superposing means is used as a decoder output signal.

4. A decoder according to claim 3, wherein said noise superposing means superposes a noise signal having a larger level on the inversely quantized signal with an increase in coarse level when the control signal designates a quantization characteristic having a coarse level higher than the predetermined coarse level.

* * * * *